Patented May 16, 1939

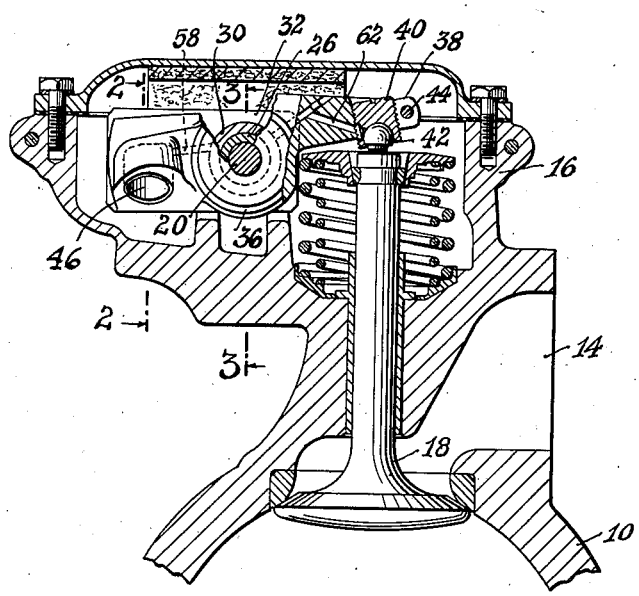
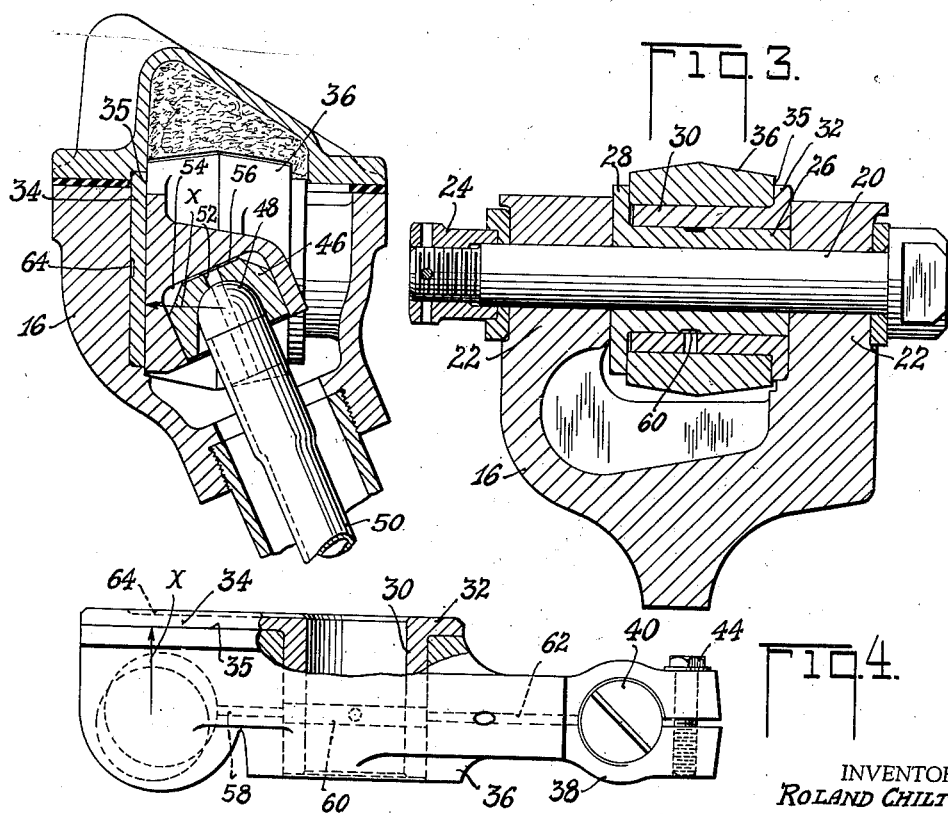

2,158,272

UNITED STATES PATENT OFFICE 2,158,272

ROCKER ARM BEARING

Roland Chilton, Ridgewood, N. J., assignor, by mesne assignments, to Wright Aeronautical Corporation, Paterson, N. J., a corporation of New York Application February 10, 1937, Serial No. 124,964

8 Claims. (Cl. 308—21)

This invention relates to improvements in bearings, and particularly in bearings subject to tilting and thrust force components, as in valve rocker arm bearings which are illustrated in the preferred embodiment of the showings, which illustrate the invention incorporated in an otherwise conventional radial aircraft engine valve gear.

In these engines, the valves are usually inclined with respect to the cylinder axis, whereas the push rods, by which the valves are operated, have a radial disposition, so that there is a relatively large angle of offset between the valve and push rod axes. The valve is operated from the push rod through a rocker arm oscillating on a fulcrum pin mounted in the rocker box of the cylinder head. The fulcrum pin is normally arranged at right angles to the valve axis, wherefore the push rod is substantially offset from the desirable 90° relation with the fulcrum pin. This results in axial thrust and in tipping or tilting loads on the fulcrum pin bearings, and these loads are usually sustained by the use of spaced ball or roller bearings.

When provisions for automatic lubrication are made, simple plain journal bearings have given good results when the push rod is at right angles to the fulcrum pin. However, the tilting and thrust load characteristics of the inclined fulcrum pin position produce corner loading which is destructive of the bearings.

Accordingly, a prime object of the present invention is to provide a simple bearing arrangement for an angulated rocker arm which will be free from tilting effects whereby the journal element of the bearing will be subject to pure radial loads so that economies in weight and cost may be effected without sacrificing durability.

Other objects and advantages will be obvious from, or will be pointed out in, the following description with reference to the drawing, in which:

Fig. 1 is a fragmentary section through a valve mechanism;

Fig. 2 is a detail section through the axis of the push rod on the line 2—2 of Fig. 1;

Fig. 3 is a detail section through the axis of the fulcrum pin on the line 3—3 of Fig. 1; and Fig. 4 is a plan detail view of the rocker arm with the bearing in part section.

In the drawing, 10 designates a conventional cylinder head having a port 14, an integral rocker box 16, and a normal valve 18. The rocker box is equipped with a fulcrum bolt 20 secured in bosses 22 of the rocker box 16 by a nut 24, as usual. Upon the bolt, there is mounted a hardened steel sleeve 26, having a flange 28, and upon this sleeve there is mounted a journal bushing member 30 having a flange 32 extended radially, as indicated at 34 (Fig. 4), to provide a long flat thrust face of contact with a companion face 35 formed on a rocker arm 36, comprising a hub having a bore bearing on the cylindrical bushing 30. The extension 34 is restrained from rocking by its engagement with a suitable ledge on the rocker box. The rocker arm includes a conventional valve-operating end 38 including an adjusting screw 40, a valve-operating ball 42, and an adjustment locking screw 44. The push rod end of the rocker arm incorporates a hardened steel cup 46, into which fits a ball 48 on the end of the usual push rod 50.

It is a feature of this invention that the thrust face 35 of the rocker arm has contact with the bushing flange 32 and its extension 34 over substantially the entire length of the push rod end of the rocker arm. The sleeve 26 serves to provide large surface area for the bushing 30 and serves as a means for resisting the clamping loads imposed by the bolt 20.

It will be clear that, under load, the inclined push rod develops a substantial thrust component in the direction of the arrow X, Figs. 2 and 4, and that with conventional constructions, employing thrust means concentric with the fulcrum pin, this component creates a tilting or binding action on the fulcrum pin bearing means. With the extension 34 of this invention, which is brought beyond the center line of the push rod ball 48, it will be clear that this horizontal component is resisted opposite to its point of origin, whereby the rocker arm bearing 30 is relieved of all tipping loads, and is subject to a purely radial bearing force.

With the spaced ball or roller bearings of current practice, the tipping component X develops considerable side play at the ends of the rocker arm unless the bearings are kept in very close adjustment. In the present invention, the loads on the extended thrust face 34 are unidirectional, and all tipping play is avoided.

The bushing 30, 32, 34 may be conveniently made of sintered material which is pervious to oil, and for high duty engines the oiling is preferably automatic, as follows: Oil is fed into the hollow push rod 50 through a push rod operating tappet (not shown), and the push rod ball cup 46 is drilled at 52 and communicates with a chamfered space 54 in the rocker by means of small grooves 56 which in turn communicate with the bearing bushing 30 by means of a drilled hole 58 in the rocker, and a groove 60 in the sleeve 26. This groove preferably further communicates with the valve-operating half-ball 42 by an additional oil hole 62 (Fig. 1). Oil seepage from the bushing 30 may be conducted along the thrust face extension 34 by means of a suitable groove 64, here shown as formed in the inactive face of the extension 34, to suit the case where this is made of oil pervious material. It will be seen that the interior of the rocker box 16 has a flat machined surface against which the thrust extension plate 34 of the bushing 30 is seated.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination, a journal, a rocker arm borne thereon for oscillation, a push rod acting on an end of said rocker arm and inclined to the plane of movement thereof tending to twist the arm out of its plane of movement, a thrust face on said arm normal to the journal axis and at said rocker end, and a housing carrying said journal having a thrust element coacting with said thrust face.

2. In combination, a rocker arm having a bearing, means to impose side loads on said arm tending to twist the arm from a plane normal to the bearing axis, a thrust face on said rocker arm remote from said bearing, and a thrust plate coacting with said face to receive the side loads imposed on the arm.

3. In combination, a rocker arm subject to side loads at one end thereof, a rocker box, a fulcrum pin secured in said box and on which said rocker arm is carried, and a rocker arm bearing carried on said pin and including a cylindrical bushing between said rocker arm and pin and including a flat thrust plate between said rocker arm and said rocker box, said plate comprising an extension of said bushing extending along and being in bearing contact with one arm of said rocker arm substantially to the end of the arm.

4. In combination, a rocker arm, for operation by an inclined pushrod, including a hub and an arm extending therefrom to engage said pushrod, said arm including a thrust face normal to the axis of said hub toward the pushrod end thereof, a thrust plate engaging said face to assume the side loads imposed thereon by said inclined pushrod, a bearing means for said hub, and means to rigidly support said plate and bearing means.

5. In combination, an inclined pushrod, a rocker arm having a pushrod engaging extension including a thrust facing toward an end of the arm, a thrust plate engaging said thrust face in opposition to the force imposed by the inclined pushrod engagement, a journal for said rocker arm integral with said thrust plate, and means to rigidly support said journal and plate.

6. In combination, a rocker arm bearing means including a thrust face on said rocker arm extending substantially along the entire length of one arm thereof, and a stationary bushing engaged in a bore in said rocker arm and providing a bearing therefor, said bushing having a stationary thrust plate extending along said arm in contact with its thrust face at points remote from said bushing.

7. The combination with a rocker arm adapted for operative connection with an inclined pushrod whereby lateral thrust is imposed on the arm, of a counter-thrust means including a flat thrust face formed on the rocker arm remote from its pivot and a stationary thrust plate extending along the rocker arm as far as the pushrod connection and in engagement with said thrust face, and a fixed journal upon which said rocker arm is borne.

8. In combination, a rocker arm having a pushrod connection at one end and a central cylindrically bored hub, said arm having a flat face at right angles to the axis of said bore and extending along the arm at least to said connection, and a bearing bushing for said arm in fitted engagement with said hub having a stationary flat thrust plate extending along said thrust face to said connection.

ROLAND CHILTON.